United States Patent [19]

Czeglédi et al.

[11] Patent Number: 4,530,819

[45] Date of Patent: Jul. 23, 1985

[54] PROCESS FOR REDUCING THE IRON

[75] Inventors: Béla Czeglédi; Mihály Csövári; Miklós Erdélyi; József Illi; Lajos Stocker; Attila Szöke, all of Pécs; Katalin Szabó née Mogyorósi, Tatabánya; Szilárd Riederauer, Budapest; Miklós Ormossy, Budapest; Gyula Térényi, Budapest; István Csurgai, Budapest, all of Hungary

[73] Assignees: Tatabánvai Szénbányák, Tatabánya; Mecseki Ercbányászati Vállalat, Pécs, both of Hungary

[21] Appl. No.: 536,232

[22] Filed: Sep. 28, 1983

Related U.S. Application Data

[63] Continuation of Ser. No. 295,241, Aug. 21, 1981.

[30] Foreign Application Priority Data

Aug. 26, 1980 [HU] Hungary ............................... 2109/80

[51] Int. Cl.$^3$ ............................ C01F 7/22; C01F 7/26
[52] U.S. Cl. .................................... 423/112; 423/128; 423/132; 423/139; 423/150
[58] Field of Search ............... 423/132, 139, 150, 112, 423/128

[56] References Cited

U.S. PATENT DOCUMENTS

| | | | |
|---|---|---|---|
| 2,376,696 | 5/1945 | Hixson et al. | 423/132 |
| 3,079,228 | 2/1967 | Skay | 423/132 |
| 3,929,963 | 12/1975 | Kurata | 423/150 |
| 3,959,438 | 5/1976 | Messner | 423/132 |
| 4,110,399 | 8/1978 | Gaudernack | 423/132 |
| 4,118,459 | 10/1978 | Falkenhain | 423/150 |
| 4,222,989 | 9/1980 | Belsky | 423/132 |
| 4,224,287 | 9/1980 | Ziegenbalg | 423/132 |
| 4,239,735 | 12/1980 | Eisele et al. | |
| 4,366,129 | 12/1982 | Czegledi et al. | 423/139 |

FOREIGN PATENT DOCUMENTS

| | | | |
|---|---|---|---|
| 2360515 | 3/1978 | France | 423/132 |
| 150459 | 5/1962 | Hungary . | |
| 205563 | 10/1923 | United Kingdom . | |
| 857245 | 12/1960 | United Kingdom | 423/132 |
| 982098 | 2/1965 | United Kingdom | 423/139 |

Primary Examiner—John Doll
Assistant Examiner—Robert L. Stoll
Attorney, Agent, or Firm—Gabriel P. Katona

[57] ABSTRACT

The invention relates to an improved process for reducing the iron content of iron-, silicon- and aluminium-containing raw materials and for producing ferric oxide, optionally along with an alumina concentrate. According to the invention the iron content of mineral raw materials, e.g. bauxites, clay minerals, colliary rocks, red muds, etc. is eliminated by passing through one or more beds prepared from the unground but preferably prebroken and sized raw material an aqueous hydrochloric acid solution, the concentration of which exceeds 100 g./lit., at a temperature below 90° C., preferably at room temperature, optionally in the presence of a flocculating agent. By pyrolytic decomposition of the ferric chloride prepared ferric oxide can be produced. The bed residue of reduced iron content can be utilized in the Bayer process for producing alum earth, as a starting substance of ceramic industry or, after treating with sulfuric acid, dissolving in hydrochloric acid or water, elimination of silica, pyrolytic decomposition of the aluminium sulfate obtained, as an alumina concentrate.

3 Claims, No Drawings

PROCESS FOR REDUCING THE IRON

This is a continuing application of application Ser. No. 295,241, filed Aug. 21, 1981.

The invention provides a new process for reducing the iron content of iron-, silicon- and aluminium-containing raw materials, preferably low-grade bauxites and clay minerals and for producing ferric oxide, optionally along with an alumina concentrate. More particularly, the invention concerns a cold, hydrometallurgical process by which the iron content of low-grade aluminium-carriers is reduced and ferric oxide and optionally an alumina concentrate are produced.

The quality of raw materials from which alum earth can be prepared or which can be used in the ceramic industry meets less and less the requirements of economic production and is less suitable for manufacturing a good-quality product. Thus the Bayer process is less economical the more iron and silicon that is present in the starting raw materials. This is due to the fact that during the alkaline dissolution, iron and silicate minerals are getting into the red mud thereby increasing its quantity and the alkali losses, and the alumina yield is also decreased. Since the environment polluting properties of the red mud are well known it is highly undesirable to increase its amount.

It has been further known for a long time that iron-free bauxites and mineral clays are particularly suitable for manufacturing fire resistant products in the ceramic industry, e.g. fire resistant bricks and shaped bricks for the iron and steel industry. The natural resources of high quality, practically iron-free raw materials (iron oxide content at most 2%) are exhausting and they can be found only in a very few sites, in India, North America, China and South Africa.

Therefore in the last decades many attempts have been made to reduce the iron content of aluminium carriers with a high iron and silicon concentration by hydrometallurgical processes, i.e. by an acid treatment. The other deironizing methods, such as physical and roasting methods did not give the desired results while the general use of chlorometallurgical processes has first of all been inhibited by apparatus difficulties and by their high energy demand. Of the acid methods the techniques disclosed in the Hungarian Patent Specification Nos. 129,334 and 130,857 are to be particularly mentioned. In these processes sulfuric acid and sulfur dioxide are used for the elimination of iron. A major drawback of these processes is that in addition to iron a substantial amount of aluminium is also dissolved, which practically precludes the possibility of using these methods in the industry. According to the Hungarian Patent Specification No. 150,459 the minerals are roased, ground and their aluminium, calcium and iron content is dissolved by a 20% aqueous hydrochloric acid solution. As a last step ferric and aluminium chloride are separated by an ion exchange method. This process is, however, not suitable for a quantitative elimination of alumina: the purity of the product obtained is not satisfactory, the hydrochloric acid cannot be recovered and therefore the process is uneconomical.

In Hungarian Patent Specification No. 173,407 there is disclosed an improved method for producing anhydrous aluminium chloride. The improvement consists in partially dissolving the iron and aluminium content of the starting materials prior to chlorination, at a temperature of 50° to 90° C. In this way the rate of aluminium chloride formation is considerably increased. This method could be used only on laboratory scale and gives no solution for the separation of the aluminium and iron.

According to the method disclosed in British Patent Specification No. 205,563 alumina is prepared from pure, crystalline aluminium chloride by dissolving the aluminium and iron content of the starting materials with hydrochloric acid, filtering and subsequently evaporating the hydrochloric acid solution and crystallizing aluminium chloride from the residue containing ferric chloride and aluminium chloride. Due to the high loss in aluminium this method is uneconomical.

According to another method, which is described in the British Patent Specification No. 857,245 iron and aluminium are dissolved from an iron-containing material with hydrochloric acid, after calcination. The solution obtained is separated from the silicon-containing residue. By heating a crude product containing ferric oxide, alumina is obtained, which is then subjected to alkaline treatment. This process is rather expensive and due to the incomplete dissolution by hydrochloric acid, its efficiency is very poor.

According to British Patent Specification No. 982,098 clay is calcined and treated with hydrochloric acid. Iron and aluminium are then separated from the chloride solution by ion exchange. The separation of aluminium by this method is not satisfactory and since hydrochloric acid is not recovered, the method is expensive.

According to the processes disclosed in U.S. Pat. Nos. 3,959,438 and 4,056,363 aluminium-, iron- and silicate-containing ores are treated with a hydrochloric acid in a tower, in continuous counterflow. From the aluminium chloride solution obtained, aluminium hydroxide is prepared and the hydrochloric acid gas released is recycled into the step of acid treatment.

A common feature of these methods is that they do not give a satisfactory solution for the quantitative separation of aluminium from iron.

Finally, we refer to the so called H-Plus alum earth manufacturing technology, which was developed by a cooperative of the firms Pechiney and Alcan [Engineering and Mining Journal, 2 (1975) 33]. According to this method the raw material is treated with a concentrated sulfuric acid/hydrochloric acid system. The energy demand of this technology is about 60% higher than that of the well known Bayer method, moreover this technique can be used economically only up to an iron concentration of about 8%. An additional drawback is that this method does not give an economic solution for the utilization of the iron. The main advantage of this method consists in the fact that it yields a very pure alum earth, in which the quantity of the impurities is about one order of magnitude lower than in the alum earth obtained by the Bayer process.

The most developed prior art method in this field is our own method disclosed in the U.S. Pat. No. 4,366,129. According to this method a finely ground mineral raw material is treated with a double amount of a concentrated hydrochloric acid solution, at 90° to 130° C.; the ferric chloride obtained is isolated by ion exchange and is converted into ferric oxide while hydrochloric acid is recovered, the residue is filtered off and either is worked up by the Bayer process or is dissolved by sulfuric acid, evaporated at 400° C., aluminium sulfate is dissolved in water and is separated from the insoluble silica and titanium oxide by filtration and finally is converted into alumina at a temperature of 800° C. to 1000° C.

The overwhelming part of the acids used in this process is recycled and in this way the process can economically be used for the deironization of any kind of aluminium carriers and for the separation of useful by-products. A disadvantage of this method is, however, that the raw material has to be ground up to a very fine grain size, and a large amount of concentrated hydrochloric acid has to be used at a high temperature, optionally under pressure. This involves technological problems and special equipment. In addition, there are serious difficulties about the filtration of the warm, acidic slurry.

The object of the present invention is to reduce the iron content of iron-, silicon- and aluminium-containing raw materials by using a considerably lower amount of hydrochloric acid, eliminating the necessity of use of a warm acid solution and of the filtration of the acidic slurry and thereby providing a more economic and simpler process.

The invention relates to a process for reducing the iron content of iron-, silicon- and aluminium-containing raw materials and for producing ferric oxide, optionally along with an alumina concentrate, which can be conventionally further manufactured, by treating the starting materials with hydrochloric acid, concentrating of the ferric chloride solution and/or subjecting it to ion exchange chromatography, subjecting the residue to pyrolytic decomposition and optionally treating the residue having a reduced iron content with sulfuric acid, dissolving the product in water, deliberating it from silica and subjecting the aluminium sulfate to pyrolytic decomposition, while hydrochloric acid and sulfuric acid are recirculated in the system. The process is characterized by passing through one or more beds prepared from the unground but preferably prebroaken and sized raw material a hydrochloric acid solution, the concentration of which exceeds 100 g/lit. and which has a temperature below 90° C., preferably room temperature, continuously or discontinuously, keeping the solid to liquid ratio between 1:0.3 and 1:1, optionally in the presence of a substance, which exerts a flocculating effect in the strong acidic medium, with a high ion concentration. The necessary hydrochloric acid concentration is ensured by absorbing at least a part of the hydrochloric acid gas formed during the decomposition of the chlorides prepared in the ferric chloride containing solution. This method is suitable for the treatment of low-grade bauxites, colliary rocks, slakes, red mud and clay minerals. According to a preferred embodiment of this process the hydrochloric acid solution is slowly passed through the beds formed from the mineral raw materials upwards, preferably at a velocity of 0.2 to 10 cm/hour. According to another preferred embodiment the hydrochloric acid solution is led through more, series-connected beds of the raw materials, in a semi-continuous conterflow. Optionally in the hydrochloric acid solution 100 to 500 g flocculating substances/tons of bauxite are dissolved or simultaneously with the feeding an aqueous solution of the flocculating agent is sprayed onto the raw material. The washing solution leaving the counterflow system, which contains about 200 to 300 g./lit. of hydrochloric acid is preferably used for a selective dissolution of calcium, magnesium and other carbonates, which are present in the raw materials, e.g. bauxite. The solution containing mainly calcium and magnesium chloride is separated from the following fractions, which are richer in ferric chloride and optionally the corresponding sulfates are prepared by means of a calculated amount of sulfuric acid.

If the iron is to be separated in a high purity, ferric chloride is adsorbed from the ferric chloride-containing solution in a known manner, preferably on an anion exchange resin, containing trimethyl amine, dimethyl ethanol amine and/or pyridine active groups, it is then eluted with water and optionally is released from calcium by sulfuric acid, evaporated and is converted into ferric oxide in a pyrolytic way. The deironized bed-residue is washed with water and is utilized, optionally after heating, in the ceramic industry, or as a deironized starting material in the Bayer process, or—after treating with sulfuric acid, dissolving in water, eliminating of silica and pyrolytic decomposition of the aluminium sulfate—as an alumina concentrate. The hydrochloric acid gas derived from the acidic and/or pyrolytic decomposition of the ferric chloride and further chlorides is partially absorbed also in the washing liquor of the bed-residue.

The invention relates to an improvement in a complicated, multi-step technology. While the technology as a whole is considerably improved by using the invention, there are naturally certain steps involved, which are known in the art. These steps are, however, used either in a modified version or in a new combination. Other steps of the technology are new per se.

A known step of the process according to the invention is the dissolution of the iron content of raw materials by hydrochloric acid, a subsequent elimination of the ferric chloride from the acidic solution by an ion exchange resin, the elution and the pyrolytic decomposition of ferric chloride, furtheron the separation of silica from the aluminium sulfate by filtration and the pyrolytic preparation of alumina, as well as the recirculation of hydrochloric acid and sulfuric acid obtained during the pyrolytic decomposition into the system. When compared to the known technologies, an essential difference consists in the fact that the raw materials need not be ground. On the contrary, it is sufficient, moreover desirable to start from broken and seized raw materials, which have a larger grain size. The fine-grinding step of the prior art methods can therefore be eliminated. A further advantage is that the treatment with hydrochloric acid according to the invention need not be carried out at an elevated temperature and/or under pressure. Thus the unpleasant step of filtration of the hot acid solution is also eliminated. According to the invention the hydrochloric acid solution, which is preferably at ambient temperature, is passed through beds of the raw materials, preferably in upwards direction at a very low velocity. In this way the acid solution passes through the beds homogeneously, and gets into an intensive contact with the raw materials, penetrating the mineral rock. By this process practically a total dissolution of the iron content of the raw materials can be achieved and the eluate discharged from the beds is pure. Therefore, there is no need to subject it to further purification. The economy and capacity of the process are considerably increased by reducing the solid to liquid ratio to the range of 1:0.3 to 1:1. The low solid to liquid ratio is first of all made possible by the semi-continuous, counterflow character of the process and by the discovery that the extraction of materials having a high iron oxide concentration need not be performed with a fresh, concentrated hydrochloric acid solution, the hydrochloric acid used for the formation of metal chlorides is supplemented by absorbing hydrochloric acid gas in the ferric chloride-containing solutions, which provide more concentrated ferric chloride solutions. A further important feature of the invention is that the ferric chloride solution passing through the bed system serves also as a solvent and dissolves the calcium and magnesium content of the mineral substance while itself undergoes a hydrolysis, being converted into ferric hydroxide. In this way the first fractions leaving the counterflow system contain only a minimum amount of ferric chloride, instead contain the majority of the calcium and magnesium content of the raw material. By this method these impurities can be separated from ferric chloride with very good selectivity. The first fractions contain also a part of the adhesive and structural water present in the mineral raw materials. It is, therefore, preferred to use these first fractions separately, since in this way the quality of the ferric chloride solution and indirectly of the ferric oxide prepared therefrom can be improved. On the other hand, calcium sulfate, magnesium sulfate and hydrochloric acid can be prepared by the treatment of the first fractions with sulfuric acid.

To obtain a practically applicable method it was necessary to prevent the ferric hydroxide precipitating in the beds formed from the raw mineral materials from stopping the extraction. Therefore, when there is a danger of this happening, a flocculating agent should be added into the system, which is capable of concentrating the ferric hydroxide even in the strongly acidic system, having a high ion concentration, and in this way ensuring that ferric hydroxide is precipitated on the surface of the ore grains and does not fill out the space among the grains of the mineral raw materials.

For this purpose for instance the flocculants Sedosan and Preastol, can be used. Sedosan is a gel-like copolymer having high molecular weight and comprising acrylic amide and sodium acrylate; it is sold by Nitrokemia Impartelepek of Balatonfuzfo, Hungary. Preastol is a polyacrylic amide of anionic character and having high molecular weight; it is sold by Kreffeld Chemische Fabrik of Stockhausen, West-Germany. The precipitated ferric hydroxide is then readily dissolved in the further fractions of the ferric chloride solution and the solution leaving the counterflow system contains at least 200 g./lit. of ferric chloride and can be subjected to pyrolysis without further evaporation.

When the quantity of the hydrochloric acid added to the starting raw material is not sufficient to a complete dissolution, e.g. when a continuous or semi-continuous counterflow system with more beds is used, the ferric chloride containing solution or a part thereof is led into an absorber, where hydrochloric acid gas is absorbed in the solution. In this step, due to the high chloride concentration obtained when hydrochloric acid gas is absorbed in the solution, aluminium chloride hexahydrate can be precipitated, which may be separated. From the precipitate aluminium sulfate can be prepared by sulfuric acid, which can be combined and utilized together with the other, similar products obtained in other phases of the production.

If ferrous chloride is present in the solution used for the acid treatment, preferably also chlorine gas is used to supplement the loss in hydrochloric acid. The process can be naturally accomplished also in an entirely continuous system and the acid treatment of the raw materials can equally be performed on a single bed. The most appropriate technical solution primarily depends on the equipment available. It is, however, essentially independent on the variant actually used, that the hydrochloric acid solution passes through the bed of the raw materials slowly, to provide a sufficient contact time and to avoid the formation of ducts in the bed. It is therefore preferred seep the liquid upward through the bed.

The concentrated ferric chloride solutions are further processed in a known manner, by concentration and/or evaporation, recrystallization and pyrolysis when ferric oxide and hydrochloric acid are obtained. When a high-purity ferric salt solution or a corresponding iron compound is to be prepared, iron is isolated from the ferric chloride solution preferably by an ion exchange resin, e.g. Varion AT-660 is a strongly basic anion exchange resin, based on a styrene-divinylbenzene matrix with quaternary amine functional groups; it is sold by Nitrokemia Impartelepek of Balatonfuzfo, Hungary. If the iron concentration of the solution exceeds 150 g./lit., about 100 g. of $Fe_2O_3$ is adsorbed on 1 lit. of the resin. By elution of the saturated resin ferric chloride solution is obtained in a high purity.

From the mineral raw material with a reduced iron content the hydrochloric acid solution is discharged and the system is washed iron-free by water preferably containing a flocculating agent upward through the bed in a counter-current. The washing liquor from which about 1 $m^3$ is used for 1 ton of bauxite can be utilized as an absorbing medium in the hydrochloric absorbers or partially for a selective dissolution of the calcium and magnesium content of bauxite.

Water is allowed to trickle down from the washed raw material poor in iron. If the raw material is bauxite, which is to be further manufactured by the Bayer process, it is preferably added into the system by "base-gun", through a hydrocyclone. In this case only the slurry of the hydrocyclone has to be ground.

Further details of the invention are illustrated by the following, non-limiting Examples.

EXAMPLE 1

As a raw material 7 kg. of bauxite with 18% adhesive humidity are used, having the following chemical composition: 53.3% of alumina, 23.0% of ferric oxide, 6.6% of silica, 2.5% of titanium oxide, 1.1% of calcium oxide, 0.5% of magnesium oxide, 12.9% of ignition loss, 0.1% of other components. The raw material is broken up to a grain size less than 20 mm. and is admixed with 2 lit. of an aqueous solution containing 300 g./lit. of hydrochloric acid and 7 g. of Sedosan flocculant. When the carbon dioxide evolution due to the decomposition of carbonates terminates, the slurry is poured onto a ballast layer placed into a 6.7 cm × 154 cm. column in a thickness of 10 cm. Thereafter a further 2.3-lit. volume of the above hydrochloric acid solution is conducted into the column through the ballast layer, upwards direction and the content of the column is allowed to stand for two days. In this time a substantial amount of the iron content of bauxite is dissolved and the hydrochloric acid concentration of the solution used for the acid treatment decreases. The obtained, ferric chloride containing solution is driven out from the column by a further 2.3 lit. volume of fresh hydrochloric acid solution, which is passed through the layer upwards, at a speed of 0.2 cm./hour. The obtained solution, which contains about 100 g./lit. of ferric chloride is saturated with hydrochloric acid gas and is used for the treatment of a further batch of fresh bauxite.

Through the bauxite slurry fresh hydrochloric acid solution is passed and the treatment is continued until 90% of the iron content of bauxite is dissolved and a solution the ferric chloride concentration of which exceeds 140 g./lit. is obtained. Calcium is eliminated from this solution by adding 135 g. of concentrated suluric acid, when 220 g. of calcium sulfate are obtained. The ferric chloride solution devoid of calcium is directly led into a pyrolysator. The ferric chloride solution is concentrated by means of the hydrochloric acid and other combustion products which enter the pyrolysator at a temperature of about 800° C. During the evaporation these gases cool down to about 100° C. The concentrated ferric chloride solution is introduced into the decomposition part of the pyrolysator through a spray head. Decomposition is performed by a heat of 4000 Kcal pro kg. of ferric oxide. Ferric oxide obtained by the decomposition of ferric chloride contains less than 0.1% chloride. Hydrochloric acid gas evolved is absorbed in the aqueous solution which is obtained after washing of the column by 7 lit. of water.

EXAMPLE 2

The broken bauxite according to Example 1 is separated into three grain fractions on a two-level vibro-screen. The powder fraction amounts to about 25%. This fraction is set aside. The remaining material consists of about 40% of a 4 to 20-mm. fraction and about 60% of a 1 to 5-mm. fraction. Into a 0.7 m.×2.8 m. column having a useful volume of 1 m³., provided with a gum lining a 15 cm. thick ballast layer and on the top of it alternating 20 to 30 cm.-layers of the above two fractions, in a total amount of 1.6 tons are filled. A second column is prepared in an analogous way. Thereafter in 1 m³. of an about 300 g./lit. hydrochloric acid solution 300 g. of Praestol 2900 flocculant are dissolved and the solution obtained is introduced into the bottom of the first column at a speed of 5 cm./hour, until the column is filled with the solution. After filling up the column the flow velocity of the hydrochloric acid solution is reduced to 0.5 cm./hour. The solution leaving the top of the first column is entirely clear, free of any deposit. 60-lit. fractions of this solution are collected and passed through the second column upwards direction. The first fractions first of all contain calcium and magnesium chloride accompanied by about 20 to 30 g./lit. of ferric chloride and drive out a substantial amount of the adhesive water from the bauxite. The solution leaving the top of the second column is practically iron-free and contains calcium and magnesium chloride as a characteristic component. In the following 300-lit. fraction the iron content is gradually increasing and the concentration of ferric chloride may be as high as 130 g./lit., while the quantity of the calcium and magnesium chlorides decreases to about 0.3 g./lit., the quantity of aluminium chloride is reduced to about 2 g./lit., the concentration of the free hydrochloric acid increases up to 150 g./lit. In the further 400-lit. fraction the concentration of ferric chloride drops rapidly and the concentration of free hydrochloric acid increases. After passing through the columns 1.6 m.³ of a hydrochloric acid solution as described above and collecting the above fractions, the columns are washed with 1.6 m.³ of water containing 200 g. of Preastol 2900 flocculant, in upwards direction. Hydrochloric acid gas released from the chloride solutions as described in Example 1 is absorbed in the washing water used as an absorbing liquor in the absorber.

EXAMPLE 3

Variant (a): Four 1.6 m.×6.7 cm. columns are filled with alternating layers of bauxite described in Example 2. The lower 10 cm. of the columns is filled with ballast having a grain size of 2 to 5 cm. and the layers of the cruder bauxite are about 10 cm. thick while the finer bauxite fraction is used in about 15 cm thick layers. One column contains about 7 kg. of bauxite. The columns are connected in series. The solid to liquid ratio in the four-stage system, including the ballast layer and the dead volumes amount to 1:0.5.

A hydrochloric acid solution having a concentration of 350 g./lit. is passed through the first column at a speed of 53 cm./day. The hydrochloric acid solution contains 14 g./lit. of Praestol 2935 flocculant. The solution leaving the top of the column is passed through the second, third and fourth columns, always in upwards direction, in counterflow. The solution leaving the fourth column practically is acid-free moreover a part of the ferric chloride formed during the acid treatment is also hydrolysed. 7 lit. of the solution discharged from the fourth column are separated, whereupon a fifth, analogeous column is connected into the process, while the first column, which contains essentially iron-free bauxite is disconnected and washed with water. In the same time the concentrated hydrochloric acid solution is directly led to the second column. The disconnected first column is washed with about 7 lit. of water to chloride-free at the speed used in the acid treatment. The first 1-lit. fraction of the washing solution contains about 350 g./lit. hydrochloric acid, the hydrochloric acid concentration of the following 1-lit. fraction is about 200 g./lit., while the following 5-lit. of the washing liquor contains about 50 g./lit. of hydrochloric acid. The first, concentrated fraction is used for the acid treatment of a further batch of bauxite, the 200 g./lit. fraction is preferably supplemented with hydrochloric acid gas, whereupon is used in the acid treatment step, while the last, dilute fraction is preferably used for the absorbtion of hydrochloric acid gas in counterflow.

The above treatment can naturally be continued by disconnecting the actual first column and connecting a new column at the end of the series until an equilibrium is achieved (at the introduction of about the 8th new column). This equilibrium is characterized by the following data: The composition of the solution discharged from the actual first column is: about 320 g./lit. of hydrochloric acid, about 30 g./lit. of ferric chloride and less than 0.2 g./lit. of calcium and magnesium. The composition of the solution discharged from the actual second column is as follows: about 70 g./lit. of hydrochloric acid, about 145 g./lit. of ferric chloride, 0.7 g./lit. of calcium and 0.4 g./lit. of magnesium. The composition of the solution discharged from the actual third column is as follows: 10 g./lit. of hydrochloric acid, about 160 g./lit. of ferric chloride, about 1.5 g./lit. of calcium and about 1.1 g./lit. of magnesium. The solution discharged from the actual fourth column, which preferably is collected in a 1.5-lit. and a 5.5-lit. fraction has the following composition: The first 1.5-lit. fraction contains about 2 g./lit. of hydrochloric acid, 40 g./lit. of ferric ion, 30 g./lit. of calcium and 15 g./lit. of magnesium; the 5.5-lit. fraction contains about 5 g./lit. of hydrochloric acid, 180 g./lit. of ferric ion, less than 1.5 g./lit. of calcium and less than 1 g./lit. of magnesium.

The 1.5-lit. fraction can be refused after neutralization with lime, or is used for the production of ferric oxide, calcium sulfate and magnesium sulfate. In the latter case 165 g. of calcium carbonate are added to the solution, the precipitated ferric hydroxide is filtered off, washed and is then added to the 5.5-lit. fraction. The filtrate is evaporated and about 350 g. of concentrated sulfuric acid are added. The precipitated calcium sulfate is filtered off. By evaporation of the filtrate crystalline magnesium sulfate is obtained.

The 5.5-lit. fraction obtained is decomposed in a pyrolysator in a conventional manner and the hydrochloric acid obtained is recycled into the acid treatment step while the ferric oxide is utilized in the metallurgy (purity: about 92%).

The bauxite obtained after washing the disconnected first column with water can be manufactured by the Bayer process or is a valuable starting material for manufacturing refractory materials. After drying this deironized material has the following composition: 14.67% of ignition losses, 69.54% of alumina, 7.92% of silica, 1.73% of ferric oxide, 2.40% of titanium oxide, 1.41% of calcium oxide, 1.25% of sodium oxide and 0.45 g. of potassium oxide. The composition of the same material after heating at 1600° C. is as follows: 81.54% of alumina, 9.28% of silica, 2.02% of ferric oxide, 2.81% of titanium oxide, 1.65% of calcium oxide, 1.44% of sodium oxide and 0.52% of potassium oxide.

If the content of the first, disconnected column is to be used for the production of anhydrous aluminium chloride, the bauxite poor in iron is not washed with water and iron is eliminated from the concentrated hydrochloric acid solution discharged from the first column by ion exchange on a Varion AT 660 resin. The spillway solution from the top of the column is conducted to the resin which is in chloride form, iron is bound in the form of a complex and by the iron-free solution obtained the iron-containing hydrochloric acid solution of the first column is displaced. In this way the washing with water and accordingly the dilution of the system can be avoided. Ferric chloride is eluted from the resin containing the iron complex by deionized water. The concentration of ferric chloride amounts to about 70 g./lit. and the product is practically free of impurities. The solution is evaporated to a concentration of about 180 g./lit. and is subjected to decomposition in a pyrolysator in a conventional manner. In this way ferric oxide and hydrochloric acid gas suitable for pigment and ferrite production are obtained. The ferric oxide has the following composition: 99.20% of ferric oxide, 0.015% of sodium oxide, 0.001% of calcium oxide, 0.002% of magnesium oxide, 0.013% of potassium oxide, 0.01% of chromium, 0.01% of vanadium, 0.04% of titanium, 0.004% of cobalt and 0.001% of nickel. The bauxite discharged from the column, which contains a concentrated hydrochloric acid solution is admixed with concentrated technical sulfuric acid solution in an amount calculated for the soluble oxides. During the admixture the temperature of the slurry obtained raises up to about 150° C. and hydrochloric acid gas is evolved, which is conducted into the absorber. The mixture solidifies in about 20 to 30 minutes. The solid substance obtained is broken to a grain size less than 5 mm., whereupon alumina is converted into aluminium sulfate with intensive heat treatment at a temperature of 380° C. to 400° C., with a conversion of 94 to 96%. The excess of sulfuric acid is distilled off and, after condensation, can be used again. The sulfate is ground to powder, is admixed with a three-fold amount of hot water at 80° to 90° C. and silicates as well as the insoluble impurities are filtered off. Aluminium sulfate is crystallized. After decomposition at about 800° C. the product is obtained in a purity of 94 to 96%. The composition of the $\gamma$-alumina is as follows: ignition losses (at 1200° C.): 2.03%, silica: 0.24%, alumina: 95.65%, ferric oxide: 0.51%, titanium dioxide: 1.27%, vanadium pentoxide: 0.067%, pentoxide: 0.235%: angle of repose: 52.5, liter volume: liter volume: 0.09 kg. The $\gamma$-alumina obtained can be chlorinated very easily. In the same time also sulfur trioxide is obtained, which is absorbed in sulfuric acid and in this form is recycled into the sulfuric acid treatment step.

Variant (b): Essentially the procedure described in variant (a) is followed with certain minor changes, as a consequence of which the calcium-rich fraction discharged from the fourth column can be worked up considerably simpler and the ferric oxide obtained has an increased purity.

The improvement consists in using from the washing liquor of the actual first column the 50 g./lit. fraction into the selective elimination of calcium and magnesium from the new, fifth column. In this way iron is practically not dissolved while about 85 to 90% of the calcium and magnesium present can be eliminated. The hydrochloric acid concentration of the spillway solution (5 lit.) leaving the fifth column is almost 0 g./lit., its ferric ion concentration is less than 1 g./lit., while its calcium and magnesium content amounts to 10 g./lit. and 5 g./lit., respectively. The solution discharged from the fourth column contains about 5 g./lit. of hydrochloric acid, 190 g./lit. of ferric ion and less than 0.5 g./lit. of calcium and magnesium. This solution can therefore directly be introduced into the pyrolysator. In this way ferric oxide is obtained in an improved quality. While the purity of the ferric oxide obtained according to variant (a) is about 92%, by variant (b) a product having the following composition can be obtained: 1.85% of alumina, 96.65% of ferric oxide, 0.07% of sodium oxide, 0.50% of calcium oxide, 0.15% of magnesium oxide, 0.07% of potassium oxide, 0.06% of chromium, 0.06% of vanadium, 0.55% of titanium, 0.006% of cobalt and 0.28% of nickel.

The main advantages of the process according to the invention over the prior art processes are as follows:

The fine-grinding of the mineral raw materials can be avoided.

The reduction of the iron content of starting materials can be performed at a very favourable solid to liquid ratio, and therefore concentrated solutions can be obtained.

Since the exhausted hydrochloric acid solution is strengthened, the efficiency of acid treatment is improved and the use of concentrated hydrochloric acid solutions can be avoided.

No heat is required for the acid treatment.

The equipments are less corroded.

The mass flows are considerably lower than in the case of the processes where slurries are used.

Since smaller volumes of solutions are used, by about 50% less solvent volumes have to be evaporated or evaporation can entirely be omitted.

The alumina content of the bauxite obtained exceeds 70%, while its iron content is below 2.5%. The bauxite is equally suitable for manufacturing alum earth by the Bayer process or for the producing refractory materials.

If the bauxite obtained is used in the Bayer process, the amount of mud corresponding to the red mud is considerably decreased.

As a consequence of the factors pointed out above the production capacity is increased and the installation and production costs are decreased.

We claim:

1. In a process for reducing the iron content of iron- silicon- and aluminum-containing raw materials and for producing ferric oxide, along with an alumina concentrate, by treating the starting materials with hydrochloric acid or with hydrochloric acid and chlorine gas, deironizing the ferric chloride containing solution with an ion exchange resin, eluting ferric chloride from the ion exchange resin, subjecting the ferric chloride to pyrrolytic decomposition, treating the residue of reduced iron content with sulfuric acid, heating to produce aluminum sulfate, and subsequently treating with water to eliminate silica, subjecting aluminum sulfate to pyrrolytic decomposition and recycling hydrochloric acid and sulfuric acid in the system, wherein the improvement comprises passing in an upward direction at a rate of 0.2–10 cm./hour in a semi-continuous countercurrent flow through one or more beds prepared from the unground raw material an aqueous hydrochloric acid solution of a concentration exceeding 100 g./lit. at room temperature, maintaining the solid to liquid ratio between 1:0.3 and 1:1, and maintaining the required hydrochloric acid concentration of at least about 100 g./lit. by absorbing at least a part of the hydrochloric acid gas formed during the decomposition of the chlorides formed in the ferric oxide containing solution.

2. A process as claimed in claim 1 wherein the raw materials are low-grade bauxites, colliary, slags, red muds, or clay minerals.

3. A process as claimed in claim 1 which comprises dissolving in the hydrochloric acid solution used for washing the bed(s) of raw materials a flocculating agent in an amount of 100–500 g./ton of bauxite.

* * * * *